United States Patent [19]
Fan

[11] Patent Number: 6,131,875
[45] Date of Patent: Oct. 17, 2000

[54] CONE-SHAPED SHOCK ABSORBING STRUCTURE FOR AN OPTICAL SCANNER

[75] Inventor: Chung-Chou Fan, Miao Lee, Taiwan

[73] Assignee: Mustek Systems Inc., Science-Based Industrial Park, Taiwan

[21] Appl. No.: 09/132,053

[22] Filed: Aug. 11, 1998

[51] Int. Cl.[7] .................................................. F16M 13/00
[52] U.S. Cl. ........................................ 248/635; 248/634
[58] Field of Search ..................................... 248/635, 634, 248/560, 562, 609, 613; 267/140.5, 141, 141.3, 153

[56] References Cited

U.S. PATENT DOCUMENTS

| 2,147,660 | 2/1939 | Loewus | 248/613 |
| 2,890,846 | 6/1959 | Schloss | 267/141.4 |
| 3,304,043 | 2/1967 | Beck | 267/140.5 |
| 4,858,880 | 8/1989 | Durand | 248/635 |
| 5,174,540 | 12/1992 | Gilliam | 248/635 |
| 5,570,867 | 11/1996 | Norkus | 248/635 |

Primary Examiner—Anita M. King
Assistant Examiner—Naschica C Sanders
Attorney, Agent, or Firm—Bacon & Thomas, PLLC

[57] ABSTRACT

A shock absorbing structure includes a cushion having a central longitudinal bore. A joint member is embedded in the central bore of the cushion and has a first part and a second part. The first part abuts against the inner side of the bore of the cushion to fix the cushion. The second part longitudinally from one end of the first part and tapers radially inwardly in the longitudinal direction thereof thus, together with the cushion, defining a progressively increasing gap as vibration space for the cushion.

6 Claims, 3 Drawing Sheets

CONE-SHAPED SHOCK ABSORBING STRUCTURE FOR AN OPTICAL SCANNER

BACKGROUND OF THE INVENTION

The present invention relates generally to a shock absorbing structure, and more particularly to a shock absorbing structure for absorbing vibration generated by, for example, a motor in a driving mechanism of a scanner.

Referring to FIG. 3, a cross-sectional view of a prior shock absorbing structure and its related structure is shown. The shock absorbing structure is used for absorbing vibration generated by, for example, a motor in a driving mechanism of a scanner. As shown in FIG. 3, a cushion 1 made of elastic materials such as rubber has a central bore 9 in which a joint member 21 is disposed so that the joint member 21 and the cushion 1 define a gap. A screw 4 is driven through the joint member 21 and a plate 3 thus fixing the joint member 21 and the cushion 1 on the plate 3. Vibration of a motor is transferred to the cushion 1 through a motor supporting plate 5 thus being absorbed by the cushion 1. However, as shown in FIG. 4, when a lateral force F is exerted on the cushion 1 through the motor supporting plate 5, pressing a central portion of the cushion 1 against the joint member 21, elastic coefficient of the cushion 1 thus increases owing to such contact of the cushion 1 to the joint member 21. In other words, the pressed cushion 1 loses some elasticity but has more rigidity, which reduces shock absorption effect of the cushion 1.

For solving the above-mentioned problem that the cushion 1 can not be fixed well, an improved measure has been proposed. As shown in FIG. 5, a thin iron tube 31 is fixed on an inner sidewall of the cushion 1 to keep the gap defined between the cushion 1 and the joint member 21 unchanged. Therefore, when a lateral force F is exerted on the cushion 1 through the motor supporting plate 5, the central portion of the cushion 1 does not bend toward the joint member 21. Though such design can fix the cushion 1 well, it increases manufacturing cost and difficulties. And what is worse, it decreases shock absorption effect.

SUMMARY OF THE INVENTION

In view of the above-mentioned prior shock absorbing structures which can not combine shock absorption and fixation effects, it is an object of the present invention to provide a shock absorbing structure which combines shock absorption and fixation effects, thus solving the problems of poor shock absorption and faulty fixation.

A shock absorbing structure in accordance with the present invention includes a cushion having a central bore. A joint member is embedded in the central bore of the cushion and has a first part and a second part. The first part abuts against the cushion to fix the cushion. The second part extends from one end of the first part and tapers off rapidly inwardly along the longitudinal direction thereof thus, together with the cushion, defining a gap as vibration space for the cushion.

The implementation of the present invention will be further illustrated with the following preferred embodiments made with reference to the accompanied drawings.

DESCRIPTION OF THE PREFERRED EMBODIMENT

Figure 1:
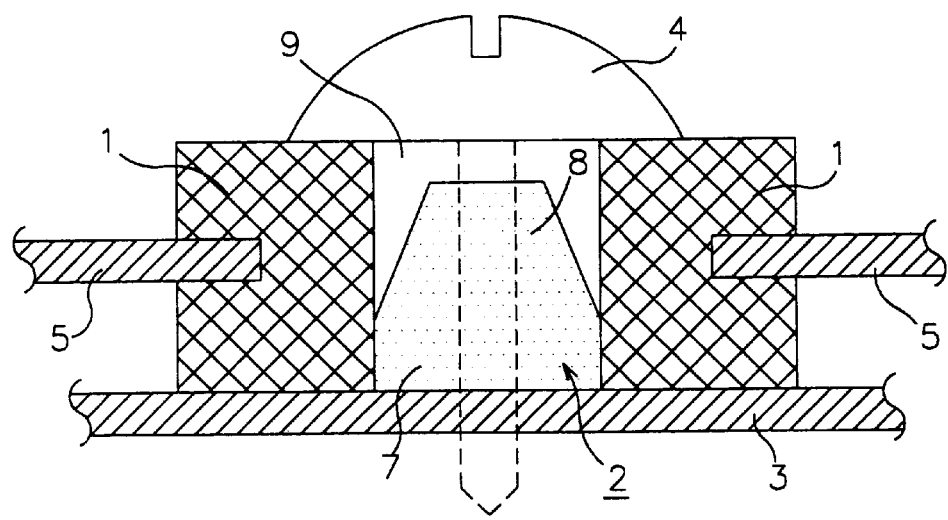
FIG. 1 is a cross-sectional view of a shock absorbing structure according to the present invention and its related structure.

Referring to FIG. 1, the construction of the present invention is illustrated. FIG. 1 is a cross-sectional view of a shock absorbing structure according to the present invention and its related structure.

The shock absorbing structure of the present invention includes a joint member 2 and a cushion 1 made of elastic materials such as rubber. The cushion 1 has a central longitudinally extending bore 9 in the form of a cylinder. The joint member 2 is embedded in the central bore 9, which combines a first part 7 and a second part 8. The peripheral shape of the first part 7 is the same as that of the central bore 9, that is cylindrical, but its diameter is not smaller than the inner side of the central bore 9 so that the first part 7 can abut against the cushion 1 in order to fix the cushion 1. The second part 8 extends longitudinally from one end of the first part 7 and is in the shape of a frustum of a cone. Namely, the second part 8 tapers radially inwardly along the longitudinal direction thereof thus, together with the cushion 1, defining a gap between the tapered portion and the inner side of bore 9 that provides as vibration space for the cushion 1.

It is to be noted that the central bore 9 of the cushion 1 is not limited to being a cylinder in shape, and that it can be any shape such as a polygonal column. In this case, the shape of the first part 7 of the joint member 2 may be changed to be the same as that of the central bore 9, and the second part 8 still tapers radially inwardly.

Figure 2:
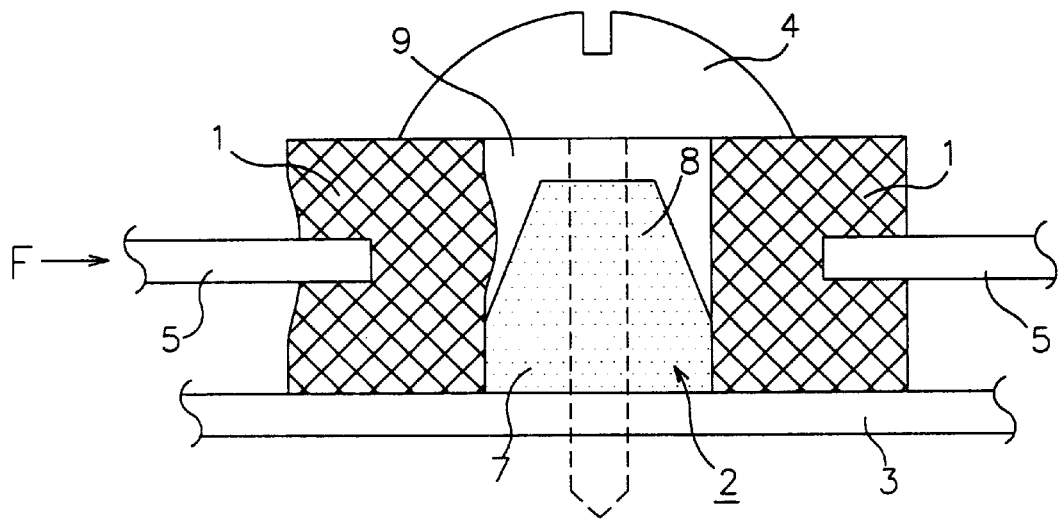
FIG. 2 shows how the shock absorbing structure of FIG. 1 deforms when it receives a lateral force.
Figure 3:
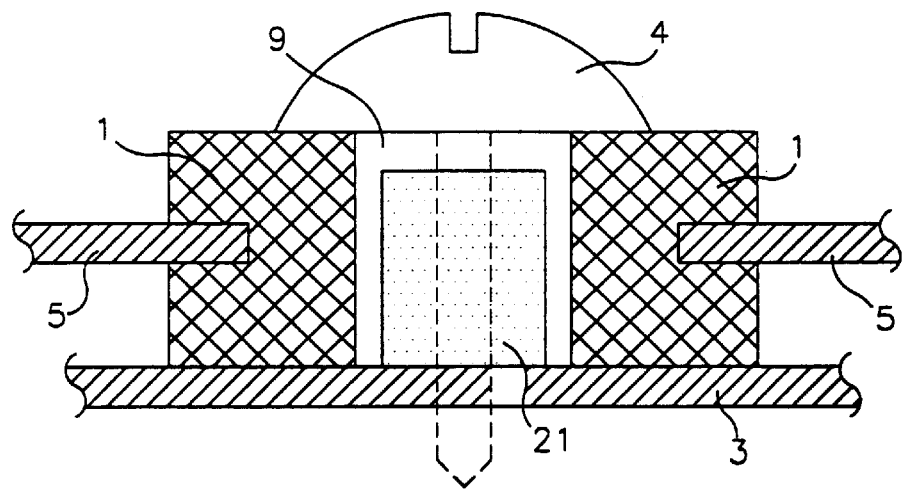
FIG. 3 is a cross sectional view of a prior shock absorbing structure and its related structure.
Figure 4:
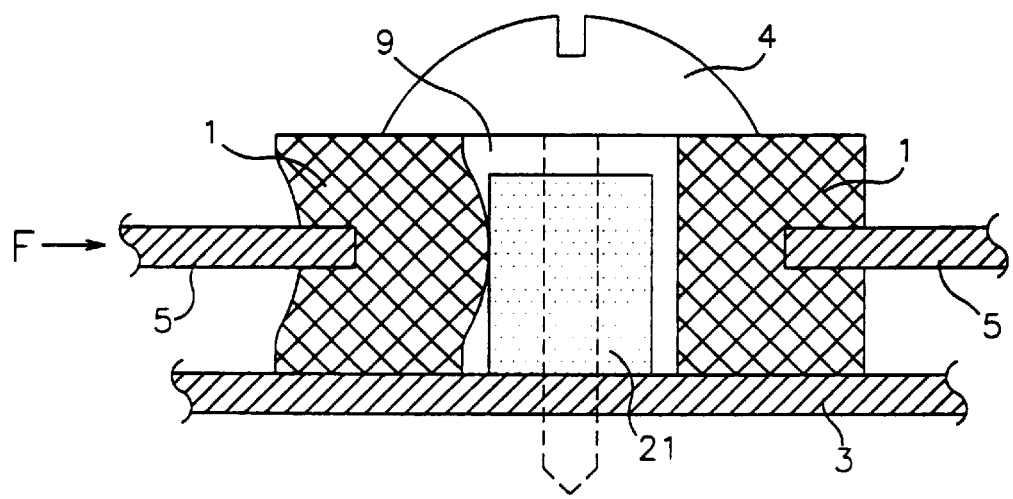
FIG. 4 shows how the shock absorbing structure of FIG. 3 deforms when it receives a lateral force.
Figure 5:
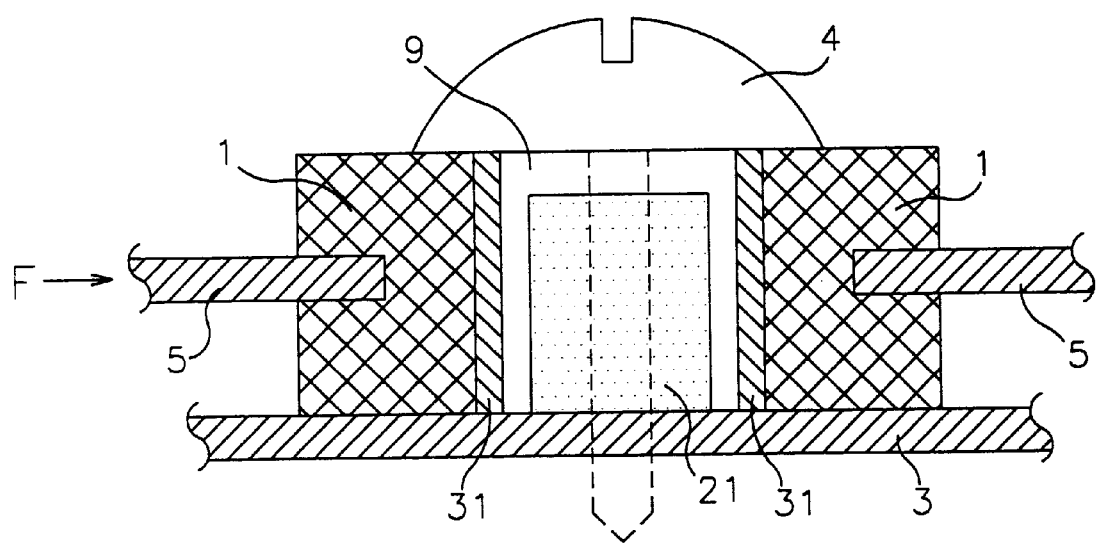
FIG. 5 is a cross-sectional view of another prior shock absorbing structure and its related structure.

The joint member 2 has a central hole through which a screw 4 is driven to fix the joint member 2 on a plate 3. Referring to FIG. 2, when a lateral force F is exerted on the cushion 1 through a motor supporting plate 5, since the first part 7 of the joint member 2 abuts against the cushion 1, the cushion 1 is fixed well and its central portion does not bend greatly so that it can avoid contact with the second part 8 of the joint member 2, which would otherwise causes the cushion 1 to have less elasticity, more rigidity and therefore less ability to absorb shock. On the other hand, the cushion 1 receiving the lateral force F bends slightly owing to the fixation effect generated by the first part 7 of the joint member 2, and also the second part 8 tapers inwardly. Therefore, there still is sufficient space between the cushion 1 and the second part 8 for accommodating vibration of the cushion 1, and the shock absorption effect is hence kept good.

While the invention has been particularly shown and described with reference to the preferred embodiments thereof, it will be understood by those skilled in the art that various changes in form and details may be made without departing from the spirit and scope of the invention.

What is claimed is:

1. A shock absorbing structure comprising:

a plate for mounting, a vibrating object;

a plurality of supporting plates for securing said vibrating object on said plate;

a cushion directly connected to two of said plurality of supporting plates and having a central bore for mounting a screw;

a joint member disposed inside said central bore of said cushion, said joint member having a first part fully filling a lower portion of said central bore to abut against the lower portion of said cushion, and an upper cone-shaped portion integrally formed on said first part, said joint member having a central hole for allowing said screw to pass through said joint member and secure said cushion to said plate;

whereby said central bore and said upper cone-shaped portion of said joint member define a space sufficient to absorb lateral vibrations of said cushion.

2. The shock absorbing structure as claimed in claim 1, wherein said joint member is made of rubber.

3. The shock absorbing structure as claimed in claim 1, wherein the diameter of said first part of said joint member is not smaller than that of said central bore.

4. The shock absorbing structure as claimed in claim 1, wherein said central bore is in the form of a cylinder.

5. The shock absorbing structure as claimed in claim 1, wherein said central bore is in the form of a polygonal column.

6. The shock absorbing structure as claimed in claim 1 and further including said vibrating object, wherein said vibrating object is a motor.

\* \* \* \* \*